Patented May 23, 1933

1,910,479

UNITED STATES PATENT OFFICE

KARL SCHMIDT, OF LEVERKUSEN-ON-THE-RHINE, GERMANY, ASSIGNOR TO GENERAL ANILINE WORKS, INC., OF NEW YORK, N. Y., A CORPORATION OF DELAWARE

POLYMETHINE DYESTUFF

No Drawing. Application filed December 20, 1929, Serial No. 415,617, and in Germany December 24, 1928.

The present invention relates to new polymethine dyestuffs of the probable general formula:

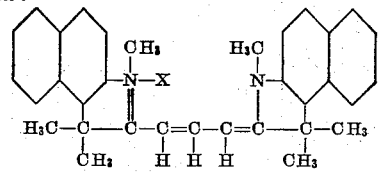

wherein $x$ stands for a residue of an acid and wherein the naphthalene nuclei may be substituted by monovalent substituents, such as halogen atoms, the acetylamino group or the like.

My new dyestuffs may be prepared as follows: By reducing a diazotized beta-naphthylamine, causing the resulting hydrazine derivative to interact with acetone and then performing ring formation by means of concentrated sulfuric acid, an alpha-methyl-2-naphthindole, is formed having the probable formula:

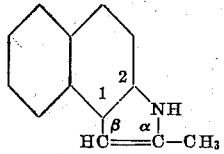

wherein the naphthalene nucleus may be substituted, which is subsequently converted into the alpha-beta-beta-trimethyl iodo-, bromo-, or chloro-methylate by means of the corresponding methyl-halide. The resulting products probably correspond to the general formula:

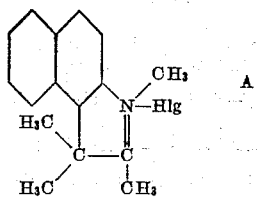

wherein the naphthalene nucleus may be substituted. The compounds, thus obtained, are treated with an ortho-formic acid ester or an alkali metal formate in acetic anhydride solution at about 120–135° C., whereby formation of my new dyestuffs corresponding to the first mentioned general formula is effected, in which formula $x$ stands for the residue of hydrochloric-, hydrobromic- or hydroiodic acid. Similar dyestuffs of the same general formula, in which $x$ stands for another acid residue, may be prepared, for example, by dissolving the former dyestuffs in water, adding caustic soda lye until the free base has formed and causing salt formation again by the addition of an acid other than a hydrohalic acid, such as sulfuric acid, formic acid, oxalic acid, benzoic acid or the like. It will also be possible to prepare such dyestuffs by treating a compound of the formula marked A with caustic soda lye, whereby the corresponding methylene base is formed having the formula:

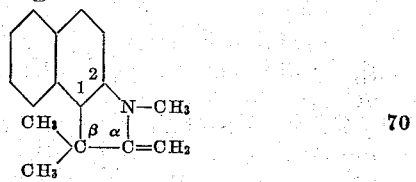

wherein the naphthalene nucleus may be substituted. Subsequently this base is caused to act upon an alkali metal formate or an ortho-formic acid ester in acetic anhydride solution at about 30–40° C., whereby the formate of a dyestuff of the first mentioned general formula is obtained. These dyestuffs may be converted into other quarternary salts either by double decomposition, for example, with sodium chloride in aqueous solution or by adding caustic soda lye to the formate, whereby the dyestuff base is freed and can be converted into other salts by the addition of any other acid.

The dyestuffs thus obtainable form yellowish to greenish glittering dark crystals which are soluble in alcohol with a violet coloration and in concentrated sulfuric acid with a yellow to brown coloration, dyeing tanned cotton violet to reddish-blue shades of good fastness properties.

The following examples illustrate my invention without limiting it thereto, the parts being by weight.

*Example 1*

10 parts of the iodo methylate of alpha-beta-beta-trimethyl-2-naphthindolenine (obtainable by the action of methyliodide on beta-methyl-2-naphthindole) are dissolved in 100 parts of acetic anhydride. After the addition of 5 parts of ortho-formic acid ethyl ester the reaction mixture is heated to boiling under a reflux until the formation of the dyestuff is completed. The separation of the dyestuff formed is carried out either by distilling off part of the acetic anhydride and causing the dyestuff to crystallize or by dissolving the distillation residue in hot water and allowing crystallization to proceed thereafter. The dyestuff, thus obtained, dyes mordant cotton or other textiles, such as wood and the like, clear violet shades of good fastness properties. The product probably corresponds to the formula:

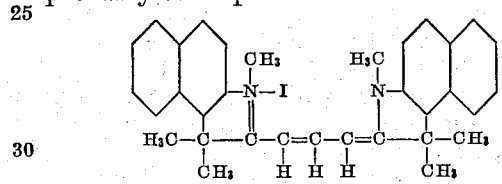

It is soluble in water with a violet coloration and in concentrated sulfuric acid with a yellow coloration.

Other salts of the dyestuff base, for example, such as are formed with hydrochloric acid or an organic acid, which salts are particularly desirable for textile printing, can be obtained, for example, by dissolving the iodide in water, adding caustic soda lye until the free base has formed and by separating the free dye-stuff base from the iodide and then treating the latter with the corresponding acid, or by using for the condensation the base obtainable from the iodo methylate alpha-beta-beta-trimethyl-2-naphthindolenine by splitting off hyrdogen iodide by means of caustic soda lye and converting the resulting dyestuff base into the desired salts by the addition of the corresponding acid.

*Example 2*

20 parts of amido alpha-methylene-trimethyl-2-naphthindoline (obtainable by nitrating and reducing alpha-methylene trimethyl-2-naphthindoline) are heated with 75 parts of acetic anhydride and 7 parts of sodium formate to about 40° C. until the formation of the dyestuff is completed. Thereafter the reaction mixture is poured into hot water, whereby a solution is formed from which the dyestuff separates after cooling. It probably corresponds to the formula:

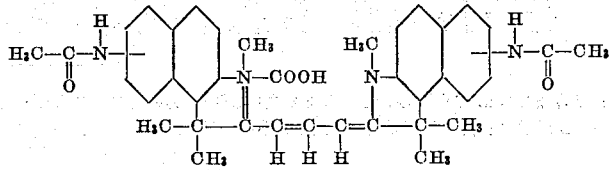

dissolves in concentrated sulfuric acid with a brown coloration. It dyes tanned cotton or cellulose acetate silk clear reddish-blue shades of good fastness properties.

I claim:—

1. The products of the probable general formula:

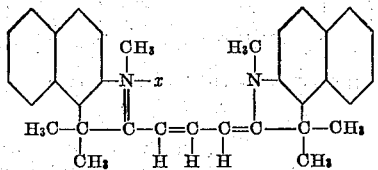

wherein $x$ stands for an acid residue and wherein the naphthalene nuclei may be substituted by monovalent substituents selected from the group consisting of halogen and the acylamino group, said products forming yellowish to greenish glittering dark crystals which are soluble in alcohol with a violet coloration and in concentrated sulfuric acid with a yellow to brown coloration, dyeing tanned cotton violet to reddish-blue shades of good fastness properties.

2. The product of the probable formula:

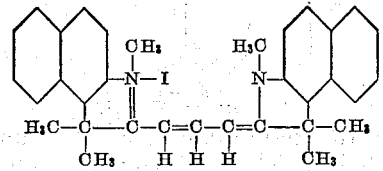

said product being soluble in concentrated sulfuric acid with a yellow coloration, dyeing tanned cotton clear violet shades of good fastness properties.

3. The product of the probable formula:

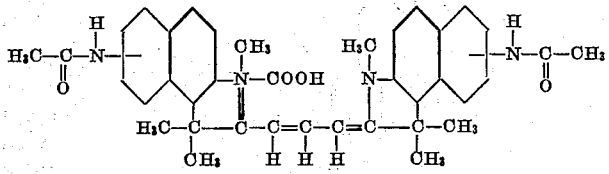

said product being soluble in concentrated sulfuric acid with a brown coloration and dyeing tanned cotton or cellulose acetate silk clear reddish-blue shades of good fastness properties.

In testimony whereof, I affix my signature.

KARL SCHMIDT.